United States Patent [19]
Byrd

[11] Patent Number: 5,389,116
[45] Date of Patent: Feb. 14, 1995

[54] GROUND COVER AND SOIL SUPPLEMENT

[76] Inventor: David A. Byrd, 5889 N. 700 W., Craigville, Ind. 46731

[21] Appl. No.: 912,255

[22] Filed: Jul. 13, 1992

[51] Int. Cl.⁶ .......................... A01H 1/00; A01G 7/00
[52] U.S. Cl. ............................................ 47/58; 47/9; 47/DIG. 10
[58] Field of Search ............... 47/58.25, 58.26, 58.27, 47/9, DIG. 10; 52/590, 593, 594; 156/60, 61

[56] References Cited

U.S. PATENT DOCUMENTS

| | | | |
|---|---|---|---|
| 3,870,583 | 3/1975 | Gidge | 156/500 |
| 3,914,900 | 10/1975 | Bigelow | 47/9 |
| 3,955,319 | 5/1976 | Smith | 47/9 |
| 4,018,025 | 4/1977 | Collette | 52/590 |
| 4,283,445 | 8/1981 | Bartholl | 428/17 |

OTHER PUBLICATIONS

Faust (1975) The New York Times Book of Vegetable Gardening Quadrangle/The New York Times Book Co., New York, N.Y. pp. 211–216.

*Primary Examiner*—David T. Fox
*Assistant Examiner*—E. F. McElwan
*Attorney, Agent, or Firm*—Lundy & Associates

[57] ABSTRACT

An improved ground cover. The ground cover is comprised of mulch and a binder. The mulch is molded into the shape desired and held together by the binder. The mulch is comprised of a plurality of small pieces. The binder surrounds the mulch and holds the mulch together. The mulch bound together is both gas and water permeable. Also, the bound mulch is biodegradable and harmless to soil and plants. The mulch may contain leachable plant nutriments. The mulch is opaque so as to retard weed growth and able to retain water.

32 Claims, 3 Drawing Sheets

GROUND COVER AND SOIL SUPPLEMENT

BACKGROUND OF THE INVENTION

The present invention pertains to lawn and garden landscaping and fertilizing materials, and more specifically pertains to environmentally sound nutrient and moisture retentive ground covers and soil supplements.

Ground covers have been used in the lawn and garden industry for many years in order to provide an aesthetic appearance around plants and hedges. The same ground covers, depending upon what they are made of, serve not only an aesthetic function, but also serve to retain vitally needed nutrients in the soil surrounding the perimeter of the plant or shrub. Wood chips, bark chips, cypress shavings, peat moss, and pebbles serve as examples. Some peat or chips have ingredients which are leachable therefrom over time. This may present a problem when such ingredients in concentrated amounts can alter the chemistry of the soil and render it inadequate for plants or shrubs and result in retarded growth or death. This is unacceptable, especially for lavish and expensive landscaping displays which have become very popular in recent years.

Furthermore, current ground covers generally require the use of a border to contain them. When they exceed their border, chips and pebbles become unsightly and dangerous projectiles that can be thrown by a lawnmower. Another problem with chips and peat moss is that because of their consistency, they must be bagged and/or handled or shoveled several times before reaching their final destination. Still another problem is the man hours of rigorous work necessary to evenly distribute chips or peat. Regardless of the care taken with existing ground covers it is common to "have an uneven consistency and "thin spots" in the overall covering. If this is not initially the case, time dictates that it will be so following, for example, the first torrential rain fall. Weeds also become a problem and sunlight is able to penetrate the covering.

Finally, yard waste is generally no longer accepted at waste dumps and mulching lawn mowers and composting are being encouraged. Not all yard waste can be mulched and composted, thereby adding to the long felt desire to recycle yard waste economically.

It is therefore highly desirable to provide an improved ground cover.

It is also highly desirable to provide an improved ground cover that contains vitally needed nutrients and is both nutrient and moisture retentive and environmentally sound.

It is also highly desirable to provide an improved ground cover and soil supplement that does not require the use of borders in order to remain in place.

It is also highly desirable to provide an improved ground cover and soil supplement that can be shipped easily and conveniently handled.

It is also highly desirable to provide an improved ground cover and soil supplement that can be conveniently and easily installed in a manner insuring and maintaining an even consistency throughout the life of the cover, and does not move once in place.

It is also highly desirable to provide an improved ground cover and soil supplement that prevents weeds from growing beneath the ground covering and becoming visible.

It is also highly desirable to provide an improved ground cover and soil supplement that is environmentally sound and is inexpensive to manufacture and transport.

It is also highly desirable to provide an improved ground cover and soil supplement that can be made of yard waste.

It is finally highly desirable to provide an improved ground cover and soil supplement which meets all of the above desired features.

SUMMARY OF THE INVENTION

It is therefore an object of the invention to provide an improved ground cover.

It is also an object of the invention to provide an improved ground cover that contains vitally needed nutrients and is both nutrient and moisture retentive and environmentally sound.

It is also an object of the invention to provide an improved ground cover and soil supplement that does not require the use of borders in order to remain in place.

It is also an object of the invention to provide an improved ground cover and soil supplement that can be shipped easily and conveniently handled.

It is also an object of the invention to provide an improved ground cover and soil supplement that can be conveniently and easily installed in a manner insuring and maintaining an even consistency throughout the life of the cover, and does not move once in place.

It is also an object of the invention to provide an improved ground cover and soil supplement that prevents weeds from growing beneath the ground covering and becoming visible.

It is also an object of the invention to provide an improved ground cover and soil supplement that is environmentally sound and is inexpensive to manufacture and transport.

It is also an object of the invention to provide an improved ground cover and soil supplement that can be made of yard waste.

It is finally an object of the invention to provide an improved ground cover and soil supplement which meets all of the above desired features.

In the broader aspects of the invention, there is provided an improved ground cover. The ground cover is comprised of mulch and a binder. The mulch is molded into the shape desired and held together by the binder. The mulch is comprised of a plurality of small pieces. The binder surrounds the mulch and holds the mulch together. The mulch bound together is both gas and water permeable. Also, the bound mulch is biodegradable and harmless to soil and plants. The mulch may contain leachable plant nutrients. The mulch is opaque so as to retard weed growth and able to retain water.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 2:
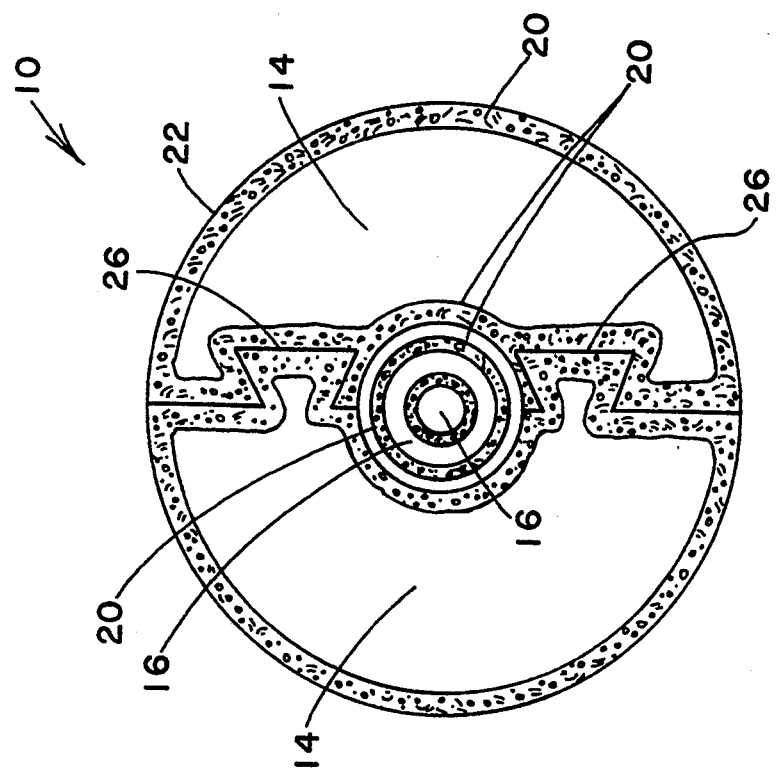
FIG. 2 is a bottom view of the ground cover of the invention shown in FIG. 1.

The nutrient and moisture retentive ground cover and soil supplement 10 of the invention has body 22 with a top 15 and a bottom 20. Body 22 is molded of mulch 12. The mulch 12 is composed of a plurality of small pieces and can be selected from the group of leaves, wood, straw, plants, grass clippings, compost, organic and inorganic fertilizers, or any combinations thereof. The mulch is bound together by a binder 11 and molded into the shape desired. The binder 11 can be any one of the available binders found in lawn and garden centers and can include flour, water, soil, and milk. The binder 11 and mulch 12 when molded into body 22 must be gas and water permeable, and biodegradable and harmless to soil and plants. The binder 11 must be mixable with mulch pieces so that the binder 11 surrounds at least a portion of the mulch pieces so that binder 11 can hold them together as body 22. The size of the mulch pieces are chosen to provide body 22 with the desired porosity. The body 22 as shown in FIGS. 1-5 is self-supporting. In a specific embodiment, mulch pieces range in size from about 0.06 to about 3.0 inches to result in bulk densities of about 20 to about 60 pounds per cubic foot. Body 22 when bound together is opaque and is able to retain water. Coloring dyes may be added to mulch 12 or binder 11 and/or applied to body 22 after it is formed, as desired. If the binder 11 is not water retentive, then the portion of the mulch pieces covered by binder 11 must be limited to provide the moisture retentiveness desired. In a specific embodiment, using a totally water non-retentive binder 11, the portion of mulch 12 covered by binder 11 ranges from about 5% to about 80%.

The nutrients 36 can be any of the organic or inorganic fertilizers available at lawn and garden centers and can include nitrogen, lime, herbicides, phosphorous, insecticides, potash, defoliants, broadleaf weed killers, and combinations thereof. The nutrients 36 must initially come in a plurality of pieces or must be crushable solids or liquids which can be absorbed by the mulch whereby the nutrients 36 can be mixed with the mulch 12 and binder 11 to form a homogeneous mixture of mulch 12, binder 11 and nutrients 36 of body 22. In a specific embodiment, nutrients 36 are provided in particles of different size of water soluble materials so as to provide nutrients over a desired period of time. A modified version, shown in FIG. 6, has a pliant binder 11 and mulch 12 combination that enables body 22 to be formed into rolls and positioned over large areas, much like carpet is laid onto flooring.

Figure 1:
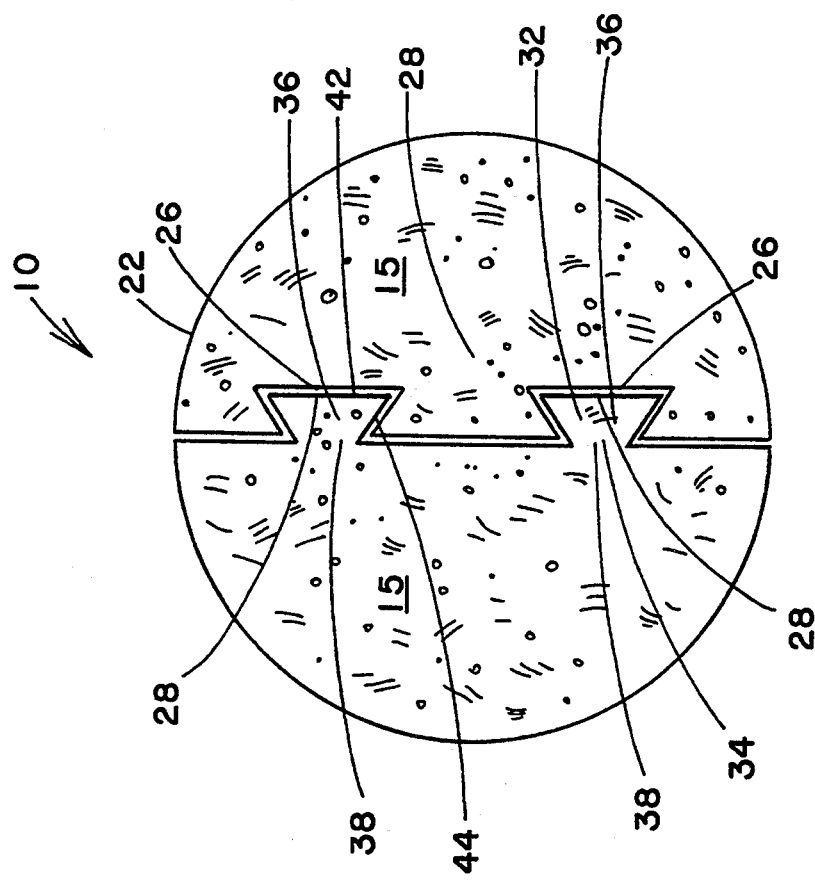
FIG. 1 is a top plan view of the nutrient and moisture retentive ground cover and soil supplement of the invention in a round shape.

Referring to FIGS. 1 and 2 ground cover 10 in a specific embodiment has base 14 secured to bottom 20 of body 22. Base 14 can be made of paper, mesh material, cardboard, molded soil and/or nutrients in sheet form and the like so long as base 14 is water permeable and biodegradable and harmless to plants and soil. Base 14 is held to bottom 20 of body 22 by the binder 11.

Body 22 is molded to have a generally circular shape and centrally positioned break-away portions 16 of various sizes. Break-away portions 16 of body 22 are less thick than the rest of body 22 as shown in FIG. 2. Body 22 can be cut or molded into two or more interlocking pieces, as shown in FIGS. 1 and 2, with tabs 26 and complementary indents 28. In other specific embodiments, body 22 pieces are provided in 3 equally sized pieces and 4 equally sized quarter pieces, respectively. Tabs 26 each have an enlarged head 32 and a neck 34 connecting body 22 and head 32. Indents 28 each have an enlarged portion 36 and a reduced entry 38 into which enlarged head 32 and neck 34 of tabs 26 fit. In a specific embodiment, tabs 26 are perforated where neck 34 joins body 22 and may be broken away when not desired. In other embodiments, tabs may be sawed off or cut off when not desired.

Figure 4:
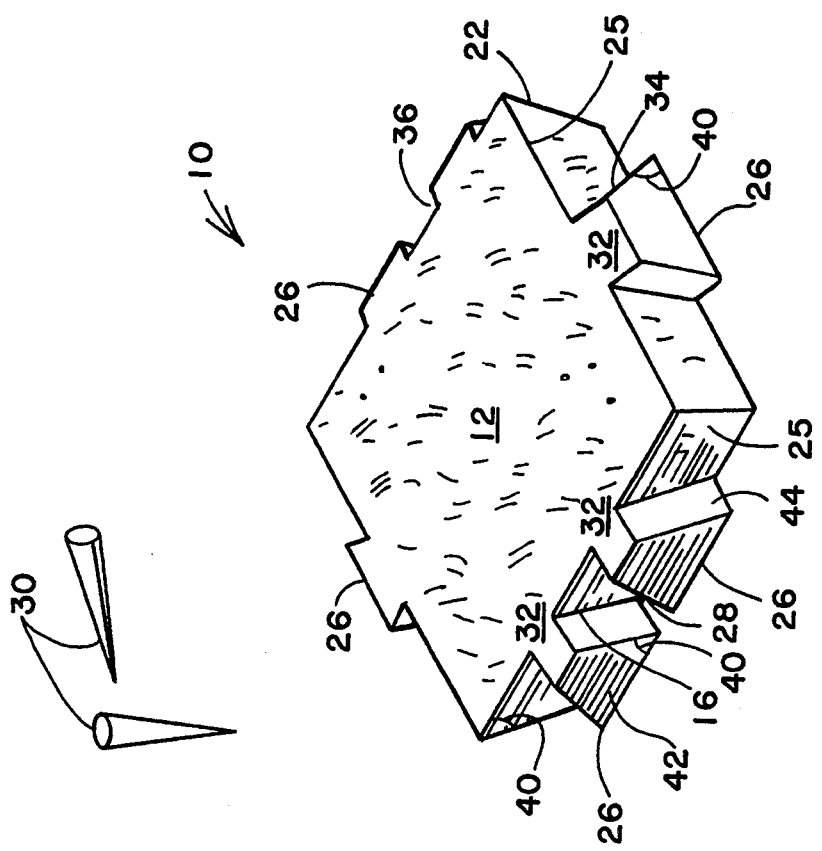
FIG. 4 is a perspective view of another modified interlocking cover of the invention.
Figure 3:
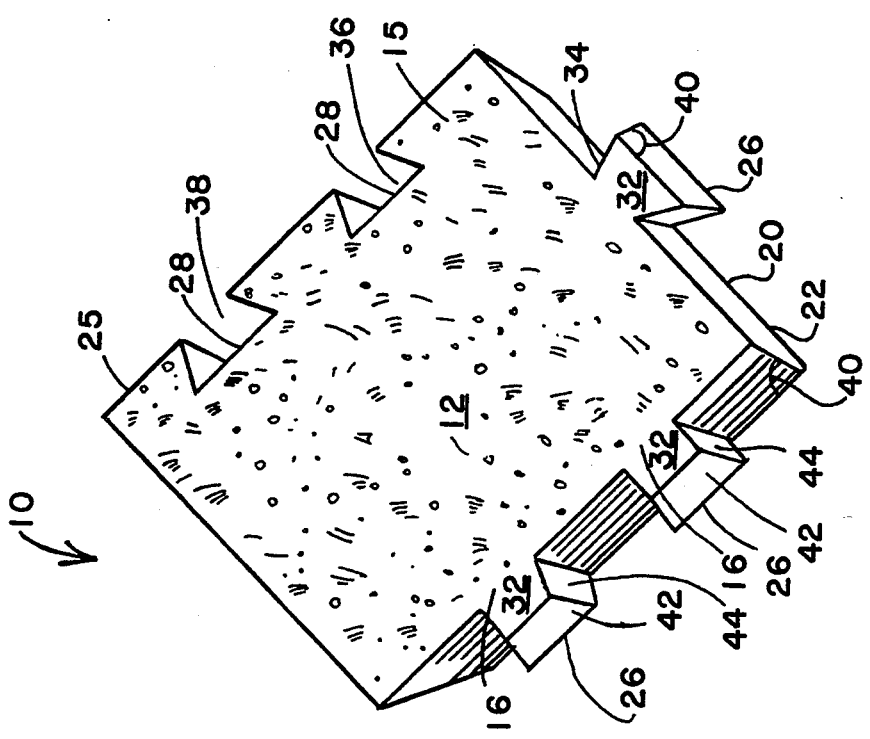
FIG. 3 is a perspective view of a modified interlocking cover of the invention in a rectangular shape.
Figure 5:
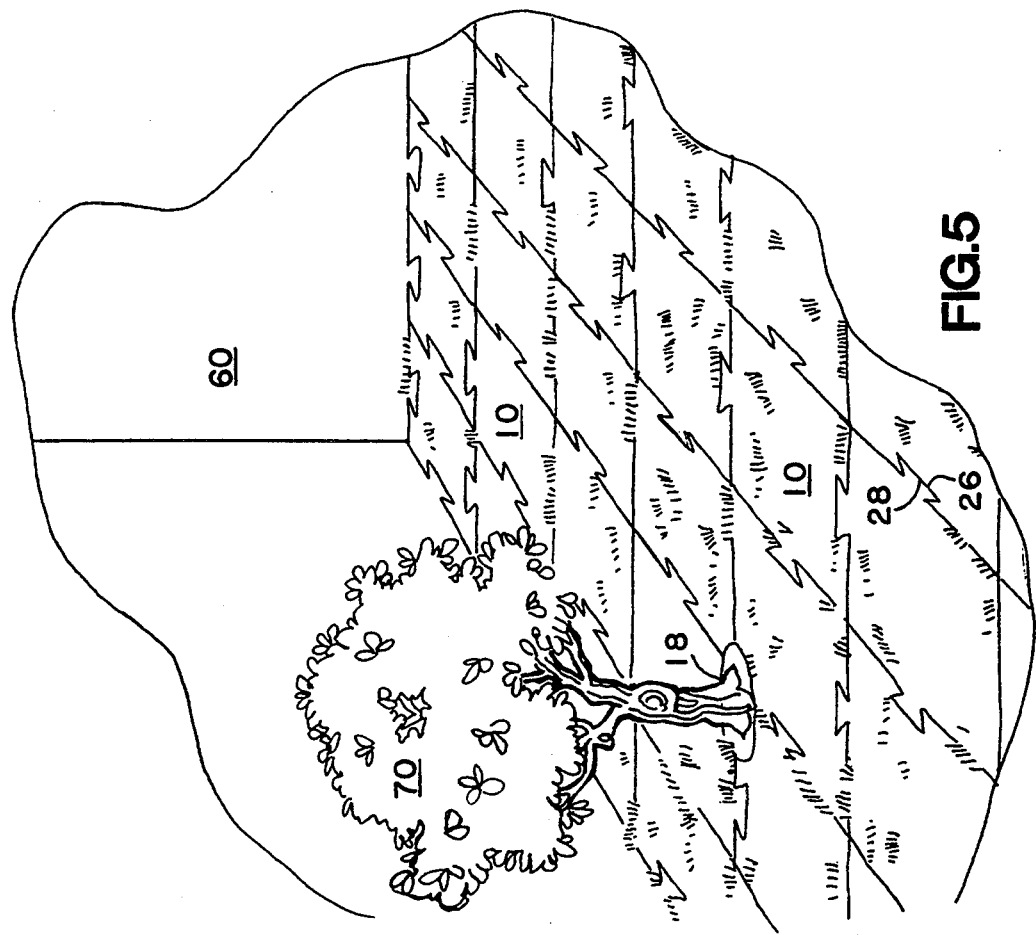
FIG. 5 is a perspective view of a plurality of the interlocking covers of the invention illustrated in FIG. 3 arranged in a landscape.

Referring primarily to FIGS. 3 and 4, in a modified version, body 22 has tabs 26 and indents 28 on periphery 25. Body 22 is shown to be rectangular, but can be triangular, or any other desired shape. Tabs 26 and indents 28 have essentially the same surface area so that ground cover 10 can be interlocked in order to cover a large surface area, like that shown in FIG. 4 without any openings therein. Tabs 26 and indents 28 can be shaped as numerously or as sparingly as desired along periphery 25 and can be disposed on only one side and end as shown in FIG. 5. Break-away portions 16 provide openings as desired. Tabs 26 are provided with break-away portions 16 such that they can be removed from body 22 when not desired as at a periphery or boundary of a plot. In a specific embodiment, the removed tabs 26 can be used to fill in unused indents 28 to provide ground cover 10 over a large area without any openings therein.

In another version, like that shown in FIG. 5, periphery 25 defines an angle 40 between top 15 and bottom 20 of body 22. Angle 40 is between about 30 and about 60 degrees. Distal ends 42 and sides 44 of enlarged heads 32 also can have angle 40, as shown in FIG. 3. In one embodiment, angle 40 is 45 degrees. This angle prevents sunlight from penetrating body 22 at periphery 25 when bodies 22 are locked together.

Spikes 30 can be provided for securing ground cover 10 to the ground. Spikes 30 are at least one and a half times as long as the thickness of body 22. Spikes 30 are preferably made of wood, fertilizer, or the like and are biodegradable.

Ground cover 10 of the invention can be produced by mixing mulch 12 and binder 11 and nutrients 36 together so that the binder 11 forms a surface coating 38 surrounding at least a portion of the mulch pieces but not encapsulating the same. Surface coating 38 is thus a porous, non-continuous, non-uniform, coating allowing moisture to pass through coating 38 to the mulch pieces to give mulch 12 its moisture retentiveness. Surface coating 38 also must have enough surface area to adequately bind mulch piece to mulch piece. Nutrients 36 can be either absorbed by the mulch 12 or if binder 11 is water soluble placed in the binder 11 as nutrients 36 will leach out of mulch 12 as time passes.

In a specific embodiment, binder 11 is a nutrient. In other specific embodiments, nutrients 36 are granular or flaked and are bound to mulch 12 by binder 11. The amount of nutrients in the ground cover 10 will vary depending upon their activity and desired dosage. Nutrients 36 in particulate form and those leachable from the mulch will be applied at different rates. Similarly, those nutrients mixed with binder 11 and requiring leaching from the binder 11 will be applied at a different rate from the nutrients adsorbed by the mulch pieces and requiring leaching from the mulch pieces. Similarly, those nutrients in pellets encapsulated by binder 11 and bound to mulch pieces by binder 11 may be applied at the slowest rate depending upon the nutrients and binder used.

In a specific embodiment, coating 38 may cover from about 5% to about 80% of the surface area of the mulch pieces, and nutrients are absorbed into mulch 12, mixing into binder 11 and bound in pellets to mulch 12 by binder 11 chosen such that ground cover 10 will provide nutrients at correct dosage level throughout the life of the ground cover 10. Such a ground cover has from about 10% to about 40% of its nutrients absorbed in mulch 12, from about 10% to about 40% of its nutrients in binder 11 and from about 10% to about 40% of its nutrients in particulate form bound to mulch 12 by binder 11.

In a specific embodiment, ground cover can also carry seed bound to mulch 12 by binder 11. One such specific embodiment has from about 10% to about 40% of its nutrients absorbed in mulch 12, from about 10% to about 40% of its nutrients in binder 11 and from about 10% to about 40% of its nutrients mixed with 1% of grass seed bound to mulch 12 to about 10% by binder 11 for lawn starts.

Mulch 12, binder 11, and nutrients 36 are placed together and thoroughly mixed. Coloring dyes are added as desired. Mulch 12, binder 11, and nutrients 36 are then placed in a mold as desired and the mulch 12, binder 11, and nutrients 36 are formed into the desired shape. Molding is accomplished at atmospheric pressure or slight pressure up to about 10 psi to maintain the desired permeability of body 22. When mulch 12, binder 11, and nutrients 36 form body 22, binder 11 is dried. In a specific embodiment, mulch 12, a water soluble binder 11, and nutrients 36 may be air dried or introduced to oven temperatures ranging from 200° F. to 250° F. for a period of about 1 to about 2 hours. Body 22 of ground cover 10 of the specific embodiment of FIGS. 1 and 2 is then removed from the mold and cut into pieces to form separable pieces as shown in FIGS. 1 and 2. In another specific embodiment, halves with tabs 26 and spaces 28 are integrally cast in a mold as desired. Base 14 can also be a single unit covering the entire surface area of bottom 20 of body 22. Thus, when cutting body 22 in half, base 14 is also cut. Base 14 thereby helps to insure that mulch 12, binder 11, and nutrients 36 remain intact as a single, integral unit.

Installation of ground cover 10 of the invention can be performed in several different ways. Referring to FIGS. 1 and 2, break-away portions 16 are gauged against the circumference of the trunk of the tree or shrub stem which will be surrounded and the proper size of break-away portion 16 is then punched out. Body 22 of ground cover 10 can then be separated into interlocking halves and positioned on opposite sides of the trunk of the shrub or tree and locked together accordingly. Ground cover 10 of the invention remains secure around the trunk of the tree or shrub and mulch 12, binder 11, and nutrients 36 and moisture will be provided to the top soil.

Figure 6:
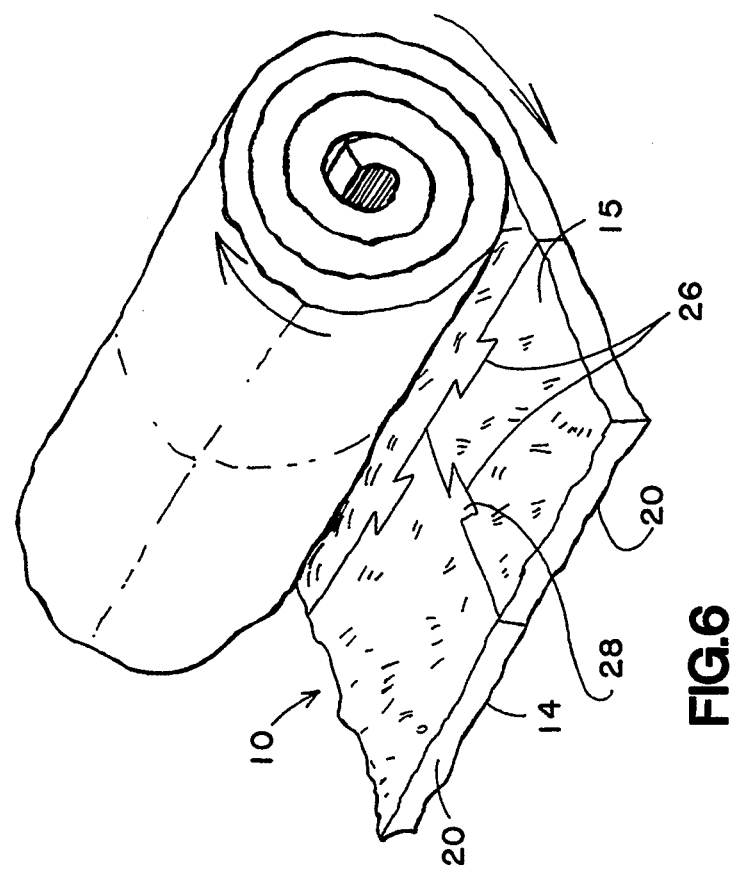
FIG. 6 is a perspective view of the nutrient and moisture retentive cover of the invention being installed in much the same way as a carpet is installed.

Installation of the ground cover 10 shown in FIGS. 3, 4, 5 and 6 can also be easily performed. A plurality of ground covers 10 having tabs 26 and spaces 28 on periphery 25 are positioned loosely in the area desired to be covered. Ground covers 10 may or may not have break-away portions 16. Break-away portions 16 are punched out as herein above described where desired leaving space 18, and ground covers 10 are locked together by positioning reciprocal tabs 26 and indents 28 of adjacent ground covers 10 together to form a carpet-like ground cover 10. Additionally, where the combination of binder 11 and mulch 12 have yielded a body 22 formed into a roll as shown in FIG. 6, body 22 is unrolled and positioned like a carpet being installed.

Spikes 30 may then be driven through body 22 and into top soil and thereby permanently securing ground covers 10 in position as desired. The perimeter of the ground covers 10 adjacent lawn 50, as shown in FIG. 4, may then be edged to produce an aesthetic landscaping surrounding trees, shrubs, flowers and the like as desired.

Ground cover 10 of the invention contains the vitally needed nutrients and is nutrient and moisture retentive. Ground cover 10 of the invention does not require the use of borders for securing the same in place and it can be easily shipped and conveniently handled. The ground cover 10 of the invention is easily installed and insures and maintains an even consistency and does not move once it is in place. Also, angle 40 of ground cover 10 prevents weeds from growing by denying sunlight where ground covers 10 lock together. Finally, the ground cover 10 of the invention can be manufactured from leaves, wood, straw, plants, grass clippings, compost, organic or inorganic fertilizers, or any combinations thereof and is therefore inexpensive to manufacture.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A nutrient and moisture retentive ground cover and soil supplement for plants comprising a body composed of mulch and a binder and a base, said mulch being a plurality of small pieces, said binder surrounding portions of said mulch pieces and holding said pieces together and to said base, said mulch and binder and base being gas and water permeable, said base and binder being biodegradable and harmless to soil and plants, said body being self-supporting and opaque and able to retain water, said cover having at least one portion of less thickness than the remainder of said cover which can be broken away to provide an opening in said cover of a shape as desired, said cover being provided in a plurality of separable portions which can be held together, said break away portion providing openings in said cover, said cover pieces being held together with a stem of a plant occupying said openings created by said break away portions.

2. The cover of claim 1 wherein said base is made of paper.

3. The cover of claim 1 wherein said base is chosen from the group consisting of mesh materials and porous sheet materials.

4. The cover of claim 1 wherein said binder is chosen from the group consisting of flour, water, soil, milk, and combinations thereof.

5. The cover of claim 1 wherein said mulch is chosen from the group consisting of leaves, wood, straw, plants, grass clippings, compost, organic and inorganic fertilizers, and combinations thereof.

6. The cover of claim 5 wherein the size of said mulch pieces is chosen to provide the cover with the desired porosity.

7. The cover of claim 6 wherein said mulch pieces range in size from about 0.06 to about 3.00 inches and said cover has a bulk density ranging from about 20 to 60 pounds per cubic foot.

8. A nutrient and soil retentive ground cover and soil supplement for plants comprising a body composed of mulch and a binder and a base, said mulch being a plurality of small pieces, said binder surrounding portions of said mulch pieces and holding said pieces together and to said base, said mulch and binder and base being gas and water permeable, said base and binder being biodegradable and harmless to soil and plants, said body being self-supporting and opaque and able to retain water, said cover being a plurality of interlocking cover pieces, said pieces having peripheral edges, said edges being shaped into portions in the form of a plurality of tabs and indents which lock together.

9. The cover of claim 8 wherein said cover pieces are generally rectangularly shaped, said tabs are shaped on two adjacent peripheral edges and said indents are shaped on the remaining two adjacent peripheral edges.

10. The cover of claim 8 wherein said peripheral edges define an angle between the top and the bottom of said cover, said tabs having angular distal ends and sides, whereby sunlight cannot penetrate said cover at said peripheral edges when said cover pieces are locked together.

11. The cover of claim 1 wherein said binder defines a porous non-continuous surface coating on said mulch, said surface coating surrounding at least a portion of said mulch pieces.

12. The cover of claim 1 wherein seed is secured to said mulch by said binder, said seed being released onto the ground upon biodegradation of said binder.

13. The cover of claim 1 wherein said binder includes nutrients chosen from the group consisting of fertilizers, nitrogen, lime, herbicides, phosphorous, insecticides, potash, defoliants, broadleaf weed killers, and combinations thereof.

14. The cover of claim 13 wherein said nutrients are in the form chosen from the group of powders, liquids and pellets, and said nutrients are chosen to provide continuing enhancement of plants over the life of said covering.

15. The cover of claim 13 wherein said coating covers from about 50 to about 80 percent of the surface area of said mulch pieces, from about 10 to about 40 percent of said nutrients are absorbed in said mulch, from about 10 to about 40 percent of said nutrients are in said binder, and from about 10 to about 40 percent of said nutrients are secured to said mulch by said binder.

16. The cover of claim 14 wherein said nutrients are absorbed by said mulch, said nutrients being leachable from said mulch.

17. The cover of claim 14 wherein said nutrients are secured to said mulch by said binder, said nutrients being released from said mulch upon biodegradation of said binder.

18. The cover of claim 1 wherein said mulch includes nutrients.

19. The cover of claim 1 further comprising at least one biodegradable spike for securing said cover to the ground.

20. The cover of claim 19 wherein said spike is made of materials chosen from the group consisting of wood and nutrients.

21. A method of manufacturing nutrient and moisture retentive ground cover and soil supplement comprising: providing mulch and binder, mixing said mulch and said binder together so that said binder surrounds at least a portion of each of said mulch pieces thereby forming a mulch and binder mixture, shaping said mulch and binder mixture, and curing said mulch and binder mixture at elevated pressures until said mulch and binder mixture is held together by said binder as an integral piece of the desired shape having at least a portion of the edges thereof shaped such that a plurality of said integral pieces may be locked together.

22. The method of claim 21 wherein said binder is selected from the group consisting of flour, water, soil, and milk, or a mixture thereof.

23. The method of claim 21 wherein said mulch is chosen frown the group of leaves, wood, straw, plants, grass clippings, compost, organic and inorganic fertilizers, or any combinations thereof.

24. The method of claim 21 wherein said curing step includes exposing said mulch and binder mixture to temperatures above 100° F.

25. The method of claim 21 including providing a base, securing a base to said mulch and binder, said base being gas and water permeable and harmless to plants and soil, said binder holding said mulch to said base.

26. The method of claim 21 further comprising cutting said mulch and binder mixture and said base into a plurality of said covers of a desired shape.

27. The method of claim 21 wherein said integral piece is formed into a shape having portions of less thickness than the remainder of said piece, whereby said portions can be broken away to provide for apertures, and different shapes of said cover as desired.

28. The method of claim 21 wherein said binder includes nutrients chosen from the group consisting of fertilizers, nitrogen, lime, herbicides, phosphorous, insecticides, potash, defoliants, broadleaf weed killers, and combinations thereof.

29. The method of claim 28 wherein said nutrients are chosen from the group of nutrient powders, liquids and pellets, and said nutrients are chosen to provide continuing enhancement of plants over the life of said covering.

30. The cover of claim 1 wherein said opening in said cover created by said break away portions is generally circular.

31. The cover of claim 1 wherein said opening is centrally located.

32. The method of claim 21 wherein at least a portion of the edges of said mulch and binder mixture are shaped into interlocking tabs and indents.

* * * * *